（12）United States Patent
Proulx (10) Patent No.: US 8,973,274 B2
(45) Date of Patent: Mar. 10, 2015

(54) FIXED LINE HEAD FOR FLEXIBLE LINE ROTARY TRIMMERS

(71) Applicant: Proulx Manufacturing, Inc., Rancho Cucamonga, CA (US)

(72) Inventor: Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 208 days.

(21) Appl. No.: 13/748,551

(22) Filed: Jan. 23, 2013

(65) Prior Publication Data

US 2014/0202009 A1 Jul. 24, 2014

(51) Int. Cl.
*A01D 34/685* (2006.01)
*A01D 34/67* (2006.01)
*B25F 3/00* (2006.01)
*A01D 34/416* (2006.01)

(52) U.S. Cl.
CPC .................................. *A01D 34/4166* (2013.01)
USPC .................. 30/276; 30/122; 30/347; 56/12.7; 56/295

(58) Field of Classification Search
USPC ............................... 30/276, 347; 56/12.7, 295
See application file for complete search history.

(56) References Cited

U.S. PATENT DOCUMENTS

| | | | | |
|---|---|---|---|---|
| 4,513,563 A * | 4/1985 | Roser et al. | ...................... | 56/295 |
| 4,550,498 A * | 11/1985 | Oliver | ............................. | 30/276 |
| 4,819,416 A * | 4/1989 | Jones | ............................. | 56/12.7 |
| 4,856,194 A * | 8/1989 | Lee | .................................. | 30/276 |
| 5,048,278 A * | 9/1991 | Jones et al. | ...................... | 56/295 |
| 5,617,636 A * | 4/1997 | Taggett et al. | .................. | 30/276 |
| 5,651,418 A | 7/1997 | Jerez | | |
| 5,836,227 A * | 11/1998 | Dees et al. | ...................... | 30/276 |
| 5,887,349 A * | 3/1999 | Walden | ........................... | 30/347 |
| 6,052,907 A * | 4/2000 | Wang | .............................. | 30/276 |
| 6,052,974 A * | 4/2000 | Harb | .............................. | 56/12.7 |
| 6,112,416 A * | 9/2000 | Bridges et al. | .................. | 30/276 |
| 6,119,350 A * | 9/2000 | Sutliff et al. | .................... | 30/276 |
| 6,185,916 B1 | 2/2001 | Johnson | | |
| 6,314,848 B2 * | 11/2001 | Morabit et al. | ................... | 83/13 |
| 6,427,341 B1 * | 8/2002 | Lee | .................................. | 30/347 |
| 6,715,270 B1 | 4/2004 | Yandle, II | | |
| 6,817,102 B2 * | 11/2004 | Harris et al. | .................... | 30/276 |
| 6,912,789 B2 * | 7/2005 | Price, III | ......................... | 30/276 |
| 7,603,782 B2 | 10/2009 | Jerez | | |
| 7,743,511 B2 | 6/2010 | Jerez | | |
| 7,878,097 B2 * | 2/2011 | Strader | ............................. | 83/13 |
| 7,913,401 B2 * | 3/2011 | Iacona | ......................... | 30/275.4 |

(Continued)

*Primary Examiner* — Hwei C Payer
(74) *Attorney, Agent, or Firm* — Holland & Knight LLP; Richard E. Lyon, Jr.

(57) ABSTRACT

A trimmer head for use with a plurality of lengths of flexible cutting line in a flexible line rotary trimmer having a plurality of line holders rotatably mounted thereon. Each line holder defines a pair of laterally spaced apertures in an upper surface thereof, a passageway extending longitudinally therethrough, terminating in an extended end thereof and communicating with the laterally spaced apertures. An interior guide surface extends along a curvilinear path from the spaced apertures to the passageway and a web extends between the apertures whereby end portions of lengths of cutting line can be extended into and through the spaced openings, along the guide surfaces into and through the passageway and outwardly therefrom, whereupon lengths of line extend about and are held against the web with portions of the line projecting from the passageways in the line holders for the cutting of vegetation.

7 Claims, 5 Drawing Sheets

(56) References Cited

U.S. PATENT DOCUMENTS

| | | | |
|---|---|---|---|
| 8,061,042 B2 * | 11/2011 | Arnetoli | 30/276 |
| 8,640,588 B2 * | 2/2014 | Strader | 83/698.41 |
| 8,769,831 B2 * | 7/2014 | Duvall | 30/276 |
| 2002/0029483 A1 * | 3/2002 | Price | 30/276 |

* cited by examiner

FIXED LINE HEAD FOR FLEXIBLE LINE ROTARY TRIMMERS

BACKGROUND OF THE INVENTION

The present invention is directed to trimmer heads for use in flexible line rotary trimmers. Flexible line rotary trimmers are commonly used for cutting vegetation such as grass and weeds, particularly along walks, fences and flower beds and around trees. These devices comprise a rotary driven head that carries one or more lengths of monofilament line mounted within a housing. Extended end portions of each line typically project from the housings through guides in the side wall of the housing. As the head rotates at high speed, the end portions of the line are caused to project outwardly from the housing by the centrifugal forces acting thereon and function as cutting blades.

The majority of trimmer heads presently in use employ two separate monofilament lines which are wrapped about a common spool mounted within the head housing. The lines project from the spool and housing through diametrically opposed guides in the side wall of the trimmer housing. When the cutting line projecting from the head breaks or becomes overly worn, fresh line must be extended from the head and the old line severed and discarded. In what are commonly termed manual-type heads, the drive motor, which can be gas or electric, is shut down and a line indexing mechanism on the stationary head is actuated to pay out additional line from the head. This is typically accomplished by the mechanism temporarily disengaging the spool from the head and rotating the spool a predetermined amount relative to the head. By simply pulling on the cutting line, a measured length of fresh line is pulled from the spool and the old line severed and discarded. In an effort to reduce the down time for line replacement, heads commonly referred to as "bump-feed" heads were developed in which the indexing mechanism is activated while the head is still rotating. The user simply presses the rotating head against the ground depressing an actuator button on the bottom of the head which temporarily disengages the line carrying spool from the housing, allowing the spool to rotate relative to the housing. The inertia of the line and centrifugal force acting on the line extending from the rapidly rotating head causes fresh line to be pulled from the spool and extended from the housing. A metering mechanism limits the relative rotation of the spool with respect to the housing and thus limits the length of the fresh lines paid out of the head. A knife guard provided at a desired radial distance from the central axis of rotation severs the worn lines, leaving the desired lengths of fresh line projecting from the head. In an effort to further streamline the line replacement process, "automatic heads" were developed. Such heads typically include a spring biased pawl-type mechanism that reacts to an imbalance in the inwardly and outwardly directed forces acting on the rapidly rotating line that results from a loss of mass in the line extending from the head due to wear or breakage. The activation of the pawl mechanism temporarily disengages the spool from the housing allowing relative rotation therebetween and the paying out of a metered amount of line. Excess material is again automatically severed by a knife guard as with the bump-feed type head.

While this evolution of the flexible line rotary trimmers from the manual head to the automatic head has significantly reduced operator time and effort in replacing worn and broken line, these advancements have met with some resistance. Each of these types of cutting heads require the user to replace the line when the original supply has been consumed. For the casual home user this can present a problem. Depending on the particular head, generally at least two separate lines, several feet in length, must be wrapped about the spool. If this is not done properly, the line may tangle within the head, interfering with the withdrawal of fresh line and requiring disassembly of the head and rewinding of the line. The more complicated the line feed mechanism, the more critical is the proper winding of the line within the head. Proper winding is particularly important in automatic heads where the slightest tangle can interfere with the functioning of the line pay out mechanism. Thus, there remains a need for a flexible line rotary trimmer head which greatly simplifies the task of line replacement for the home user.

Several attempts have been made to provide a more user-friendly rotary cutting head. Such heads typically employ one or more short lengths of a line which are anchored within the head in lieu of the longer lengths of line wrapped about an interior spool. These heads are frequently referred to as fixed line cutting heads. While fixed line cutting heads have eliminated the need to carefully wrap the line about the spools to prevent tangles, many such heads still require disassembly to replace worn or broken line. Others are costly to produce and compatible with only a single diameter line size.

Examples of fixed line heads which do not require disassembly to effect line replacement include U.S. Pat. Nos. 6,519,857 and 6,928,741 which disclose trimmer heads in which a pair of opposed lengths of cutting line are inserted into the head adjacent to spring biased toothed cams. The springs cause the cams to bear against the line with sufficient force to hold the line in place both during use and when the head is at rest. While such a fixed head configuration is compatible with a variety of line sizes, it would be desirable if the cost of manufacture could be reduced.

The trimmer head of the present invention is directed to a low cost simplification of the fixed line head that is compatible both with a variety of line sizes and for use with rigid blades for heavier grass or weed clearing operations.

SUMMARY OF THE INVENTION

Briefly, the present invention comprises a fixed line trimmer head for flexible line rotary trimmers in which a plurality of equiangularly spaced line holders are rotatably and preferably removably mounted on an upper surface of the head. Each of the line holders defines a pair of laterally spaced openings in the upper surface of the line holder that communicate with an enlarged common passageway that extends longitudinally through the line holder and terminates at the extended end of the holder. A line guide surface is provided within the line holder that extends from the openings in the upper surface of the line holder along a curvilinear path into the enlarged passageway so as to provide a smooth transition for cutting line inserted into the line holders through the openings in the upper surface thereof to and through the common passageway therein.

Through the aforesaid configuration, the opposed extended ends of a length of flexible cutting line can be readily inserted into each line holder through the two laterally spaced openings in the upper surface thereof and urged downwardly therethrough, whereupon the two ends of each length of line abut the guide surface within the line holder and are directed by the guide surface into and through the passageway in the line holder, exiting the passageway through an outlet opening in the radially extended end of the line holder. Upon pulling outwardly on the portions of the line projecting from the extended end of the holder, a midpoint of the line is pulled against and caused to form a tight bend about the web defined by the material between the two laterally spaced openings in the upper surface of the line holder. During use, centrifugal force generated by the rapid rotation of the trimmer head causes the two portions of the line extending radially from each of the line holders to project radially in a spaced disposition from the line holder for the cutting of the vegetation.

The web about which the line extends cooperates with the curvilinear path forced on the line by the guide surface to grip the line and secure a variety of differently sized cutting line in place on the line holder both during use and when the head is at rest, thereby increasing the versatility of the trimmer head. In the event of line breakage or excessive line wear, a length of line can be readily removed from the individual line holders for replacement simply by pulling upwardly and rearwardly on the exposed and readily accessible portion of the line that extends about the web in the upper surface of the line holder.

Because of the rotational mounting of the individual line holders, the line holders can rotate in either direction about a vertical axis, limited only by the raised hub in the center of the head through which a drive shaft or bolt typically projects to effect the operative securement of the head to the rotary trimmer. Thus, upon the line encountering immoveable objects such as rocks and fences during use, the rotational mobility of the line holder reduces the stress on the line along the points of contact. In addition, the interior side walls of the passageways extending longitudinally through the line holders are radiused proximate the extended ends thereof to further minimize stress on the line during use.

In addition to accommodating variations in the diameter of the cutting line, providing ease of line loading and removal and minimizing stress on the line during use, the preferred mounting of the line holders on the trimmer head allows for the easy removal of the line holders and replacement thereof with relatively flat elongated cutting blades for use in heavier vegetation clearing operations.

It is therefore the principal object of the present invention to provide a versatile cutting head for use on flexible line rotary trimmers that simplifies line loading and removal and reduces stress on the line during use.

DETAILED DESCRIPTION OF THE PREFERRED EMBODIMENTS

Figure 1:
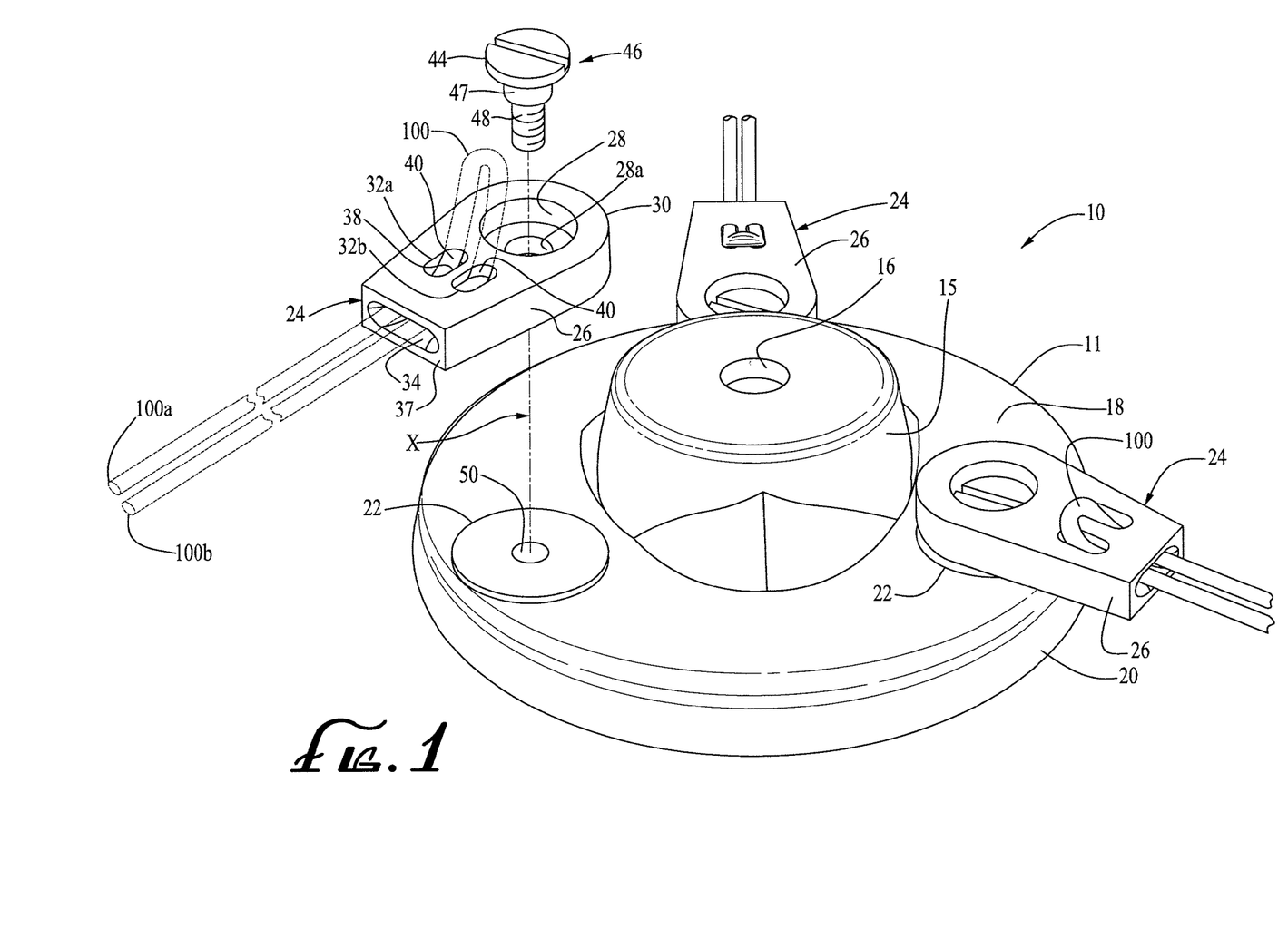
FIG. 1 is a partially exploded perspective view of the cutting head of the present invention.
Figure 2:
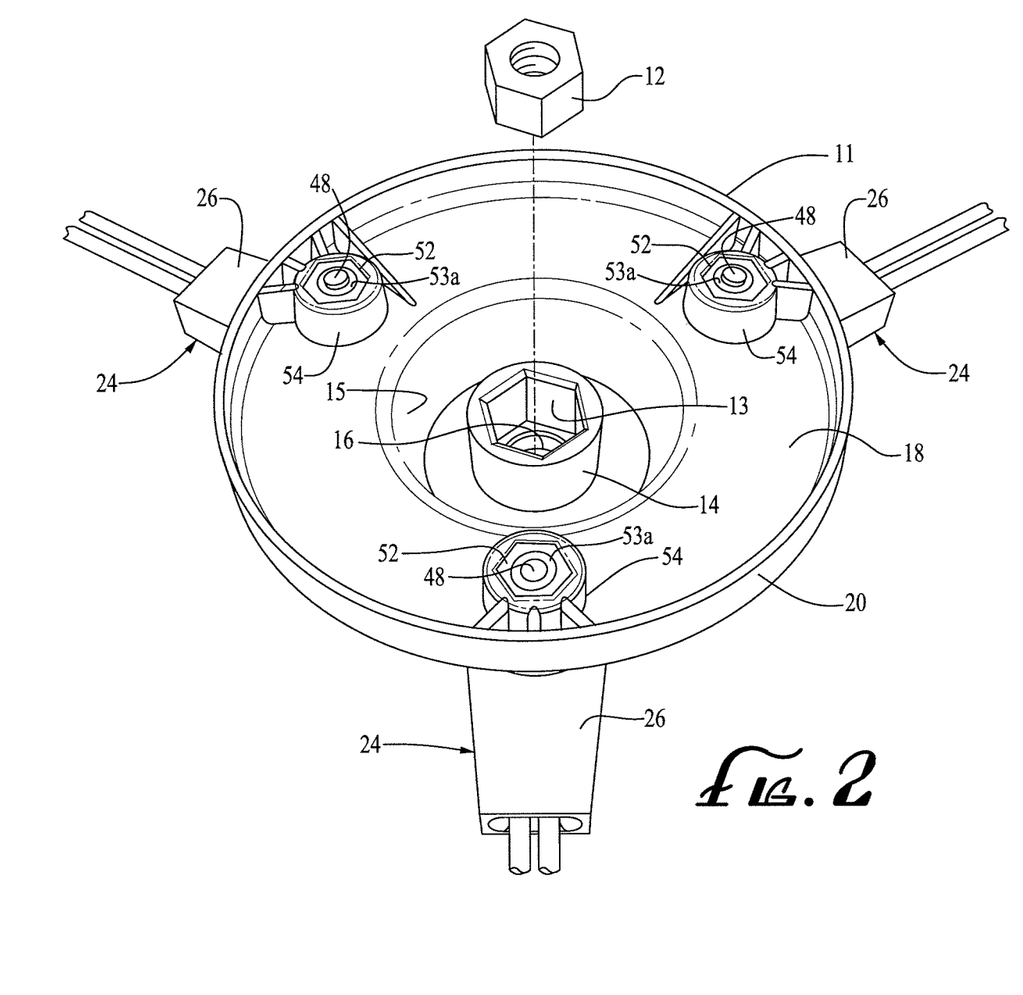
FIG. 2 is a partially exploded perspective view of the underside of the cutting head of the present invention.
Figure 3:
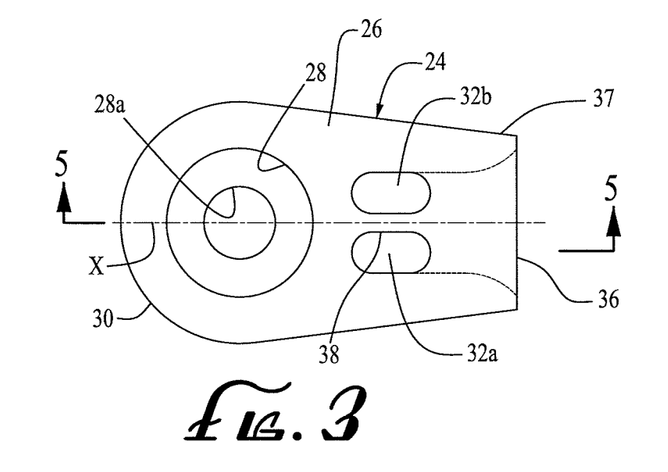
FIG. 3 is a top view of a line holder of the present invention.
Figure 4:
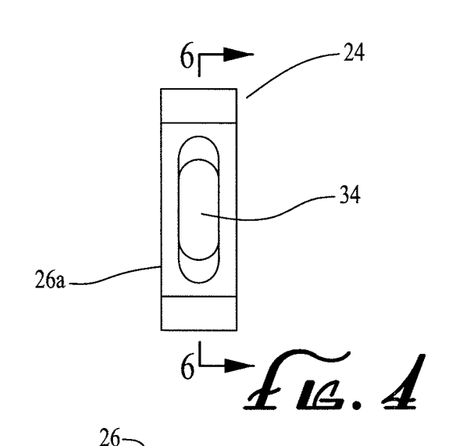
FIG. 4 is an end view of a line holder of the present invention.
Figure 5:
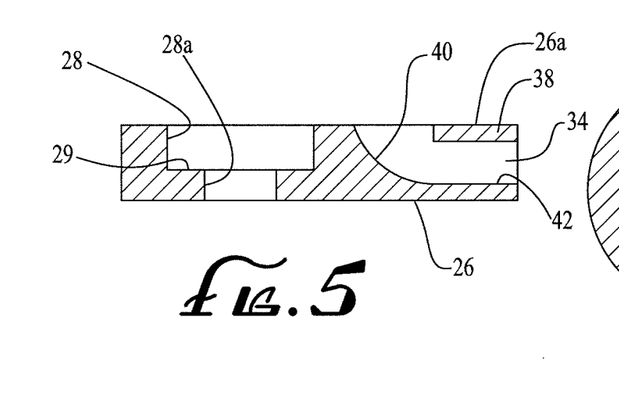
FIG. 5 is a sectional view taken along the lines 5-5 of FIG. 3.
Figure 6:
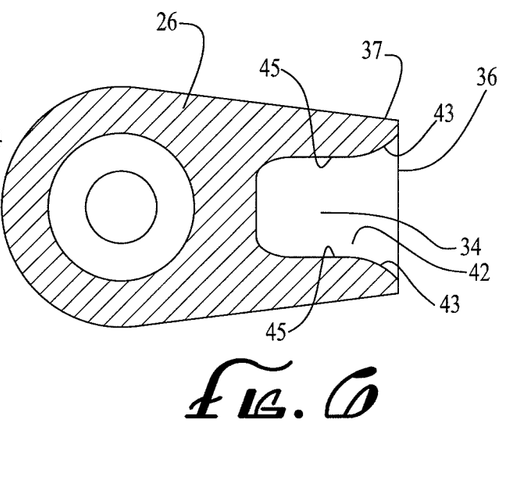
FIG. 6 is a sectional view taken along the line 6-6 of FIG. 4.

Referring now in detail to the drawings, the illustrated embodiment of trimmer head 10 of the present invention comprises a housing 11 that is adapted to be secured to the threaded lower end of a rotatable drive shaft on a gasoline or electric powered rotary trimmer (not shown) by means of the shaft's threaded engagement with a nut 12 disposed within the trimmer head housing 11. Nut 12 (illustrated in FIG. 2) preferably has a head configuration (e.g. hex) that mates with the interior walls 13 of a tubular member 14 that depends from the upper interior surface of a raised hub 15 in the center of the head. As seen in FIG. 2, the tubular member 14 is disposed directly below and is axially aligned with a central aperture 16 in hub 15 through which the threaded extension on the trimmer drive shaft extends to threadably engage the nut 12. Other means of securing the trimmer head to the drive mechanism of the trimmer are well known and could readily be employed in the trimmer head of the present invention.

Trimmer head 10 also defines an annular substantially horizontal, upper surface 18 disposed about the raised hub 15 and a relatively shallow depending skirt 20 that extends about and depends from the perimeter of the upper head surface 18. A plurality of line holders 24 (three being shown) are equiangularly spaced about head 10. Each of the line holders 24 is preferably mounted on a slightly flat, elevated support surface 22 on the upper head surface 18 and defines a body portion 26 that is symmetrically configured about a central axis X extending longitudinally therethrough. Each line holder defines a mounting aperture 28 proximate the rearward end 30 of the holder 24, a pair of laterally spaced and preferably elongated openings 32a and 32b in the upper surface 26a thereof that communicate with a common passageway 34 extending longitudinally through the line holder. Passageway 34 terminates in a line outlet opening 36 in the extended end 37 of the line holder 24. The openings 32a and 32b in the upper surface 26a of the body portion of the line holder are spaced by a web 38 extending therebetween that preferably is flush with the upper surface 26a of the line holder. A line guide surface 40 is disposed within the body of the line holder below the elongated openings 32a and 32b therein and extends from the rearward ends of the openings outwardly along a curvilinear path below web 38 and merges into the lower surface 42 of the common passageway 34. The opposed lateral side walls 45 of passageway 34 proximate the outlet opening 36 are preferably radiused outwardly at 43 to define opposed curvilinear line abutment surfaces for the line 100 to reduce wear on the line during use. In a preferred configuration, a radius of curvature of about 0.250 in. has been employed.

The mounting apertures 28 in the line holders each preferably define an annular shoulder 29 therein to accommodate the head portion 44 of a fastener 46 in a recessed or flush mounting with the upper surface 26a of the line holder and provide aperture 28 with reduced diameter lower portion 28a. The fastener 46 extends through the mounting aperture 28 such that the head portion 44 of the fastener rests on the shoulder 29 and an upper enlarged diameter smooth shank portion 47 of the fastener extends through the reduced diameter portion 28a of mounting aperture 28. The lower portion 48 of fastener 46 is preferably threaded and extends through an aligned aperture 50 in head surface 18 and threadably engages a securement nut 52 held within a tubular extension 54 depending from the interior of head surface 18 below aperture 50 (see FIG. 2). The interior wall surfaces of the extensions 54 within housing 11 are preferably configured to mate with the exterior surfaces of the securement nuts 52 so as to facilitate the threaded engagement of the fasteners 46 with nuts 52 and the resulting securement of the line holders to the housing. The securement nuts 52 are preferably of a hex configuration and provided with nylon locking inserts 53a to inhibit inadvertent loosening of the threaded engagements of the nuts 52 with their respective fasteners 46. In a preferred manufacturing process, the trimmer head 10 is injection molded of glass reinforced nylon material and the securement nuts 52 are inserted into their respective tubular extensions 54 shortly after the molding of the head so that upon cooling, the tubular extensions 54 will shrink about the securement nuts locking the nuts in place within the extensions.

Figure 7:
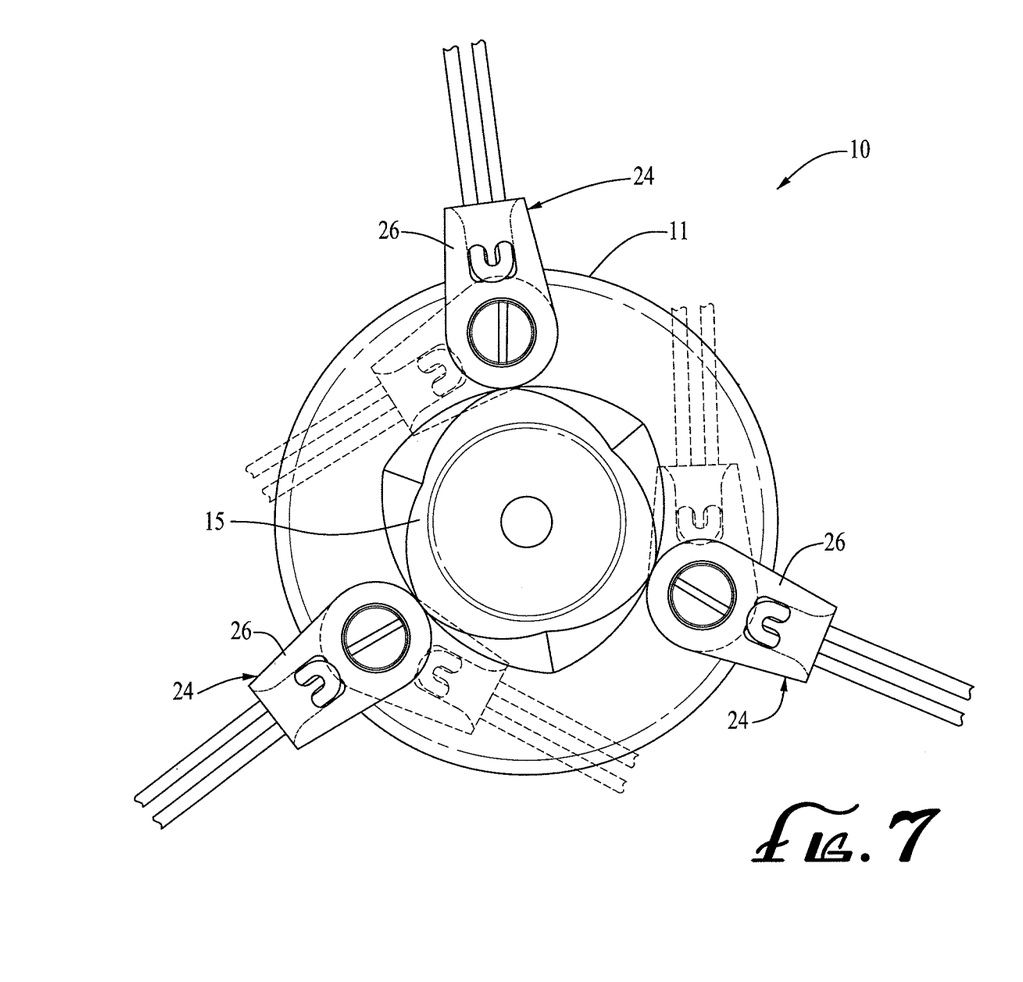
FIG. 7 is a top view of the cutting head of the present invention illustrating the rotational mounting of the line holders thereon in dashed lines.

The axial lengths of the smooth and threaded shaft portions of fasteners 46 and 48 are sized relative to the thickness of the shoulders 29 in the mounting apertures 28 within the line holders 24 such that upon tightening the fasteners in place, the lower threaded portions 48 of the fastener shafts are in threaded engagement with the securement nuts 52 mounted in the tubular extensions 54 in the underside of the head and the smooth upper portions 47 of the fastener shafts are disposed interiorly of and adjacent to the shoulders 29, whereby the line holders are securely fastened to the upper surface 18 of the trimmer head 10 but freely rotatable, both clockwise and counterclockwise, about the smooth upper shaft portions of the fasteners, limited only by the abutment of the side walls of the line holders against the upwardly projecting centrally disposed hub 15. Thus, during use, when the line projecting from the line holders encounters an immovable object such as a fence, wall or large rock, the line holders can pivot opposite to the direction of head rotation (see FIG. 7) and thereby reduce the stress of the impact on the line.

To load the individual lengths of cutting line onto the individual line holders, a length of nylon cutting line 100, approximately 12-13 inches long, is bent back upon itself at its midpoint and the extended opposed ends 100a and 100b of the line are each inserted through one of the openings 32a and 32b in the upper surface of one of the line holders. The length of line is then pushed downwardly into the openings such that the two ends of the line abut the line guide surface 40 within the holder and are directed by surface 40 into and through the common passageway 34 extending longitudinally through the line holder 24. The portions of the cutting line projecting from the extended end 37 of the line holder, are then pulled outwardly from the line holder, causing the line to bend tightly about the web 38 and extend along the curvilinear path defined by the guide surface, securing the length of line in placed on the line holder. The web 38 cooperates with the line inlet openings 32a and 32b and the line guide surface 40 to define a pathway for the length of line 100 that will accommodate and tightly secure a variety of line diameters when the trimmer head is in use and while at rest.

During use, the trimmer head rapidly rotates and the two projecting portions of the line are held in a generally parallel radial disposition as they emerge from the common passageway 34 that extends longitudinally through the line holders. When the line becomes worn, cut or otherwise damaged, removal and line replacement is readily achieved by virtue of the fact that the locations at which the lengths of cutting line extend about the webs 38 between openings 32a and 32b on each line holder are both visible and readily accessible, whereby those exposed portions of the line can be readily gripped and the lengths of line pulled rearwardly from the individual holders.

Figure 8:
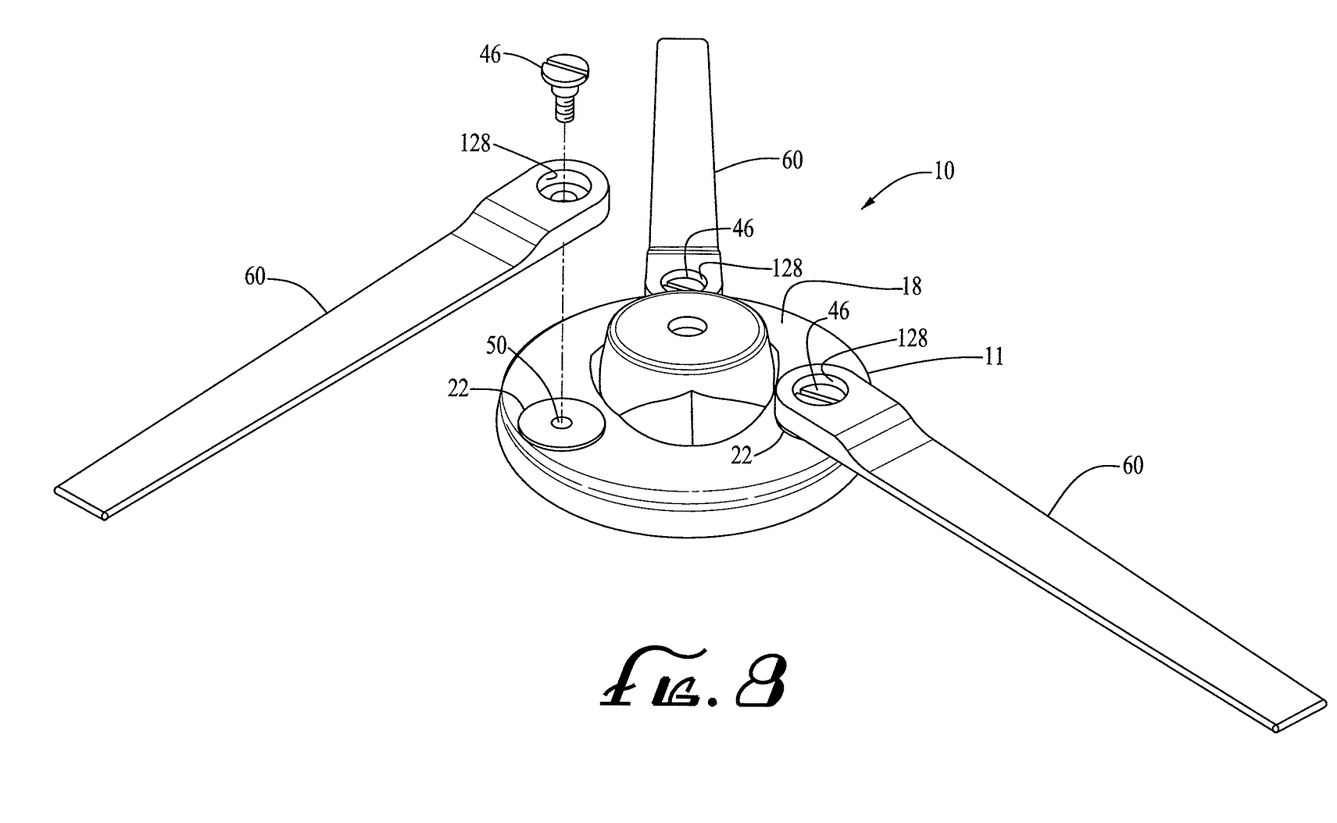
FIG. 8 is a partially exploded perspective view showing the use and mounting of relatively flat rigid cutting blades on the trimmer head of the present invention.

For heavy vegetation clearing applications, the line holders 24 can be removed and replaced with relatively flat rigid cutting blades 60 (see FIG. 8). This removal and replacement is readily achieved with the mounting assemblies utilized in the preferred embodiment of the present invention. Those mounting assemblies comprise the equiangularly disposed support surfaces 52 on the surface 18 of the housing, fasteners 46 and the axially aligned apertures 50 in surfaces 52, tubular extensions 54 in the underside of the head 10 and the securement nuts 52. By providing the rigid cutting blades, preferably formed of a durable plastic material such as high impact copolymer nylon, with mounting apertures 128 similar in configuration to the mounting apertures 28 in the line holders 24, it is only necessary to unscrew the fasteners 46 from their threaded engagement with their respective securement nuts 52, replace the line holders 24 with the cutting blades 60 and threadably reengage the fasteners 46 with the securement nuts 52.

Various changes and modifications can be made in carrying out the present invention without departing from the spirit and the scope thereof. Insofar as those changes and modifications are within the purview of the appended claims, they are to be considered as part of the present invention.

What is claimed is:

1. A trimmer head for use with a plurality of fixed lengths of flexible cutting line in a flexible line rotary trimmer, said head comprising:

a housing defining a mounting hub, an annular upper surface extending about said mounting hub and means associated with said mounting hub for securing said head to a rotary trimmer; and a plurality of line holders rotatably mounted on and equiangularly disposed about said upper annular surface of said housing, each of said line holders defining a pair of laterally spaced openings in the upper surface thereof, a passageway extending longitudinally through a portion of said line holder and terminating in an extended end thereof, each of said openings communicating with said passageway, a guide surface disposed within said line holder, said guide surface extending along a curvilinear path from said openings to said passageway, and a web disposed between said openings whereby upon urging opposed end portions of a length of cutting line into and through said openings, said end portions are directed by said guide surface into and through said passageway and outwardly therefrom through said extended end of said line holder such that upon said end portions being pulled longitudinally from said line holder, said line is caused to extend about and against said web and along said curvilinear path, thereby securing said line to said line holder such that first and second portions of said line project from said passageway in said line holder for the cutting of vegetation and a third portion of said line is positioned exteriorly adjacent to said web for access thereto whereby said third portion can be gripped and pulled from said line holder to effect removal and replacement of the line as necessary.

2. The trimmer head of claim 1 wherein said line holders are mounted for at least limited clockwise and counterclockwise rotation and opposed sides of said passageway proximate said extended end of said line holder are convexly curved whereby stress on said line is reduced during use.

3. The trimmer head of claim 1 wherein said web is vertically spaced from said guide surface.

4. The trimmer head of claim 1 wherein said web cooperates with said laterally spaced openings and said guide surface to secure lengths of cutting line of varying diameters to the line holders both during use and when at rest.

5. The trimmer head of claim 1 wherein said line holders each further define a mounting aperture extending therethrough proximate an opposed end thereof from said extended end and an annular shoulder disposed in said mounting aperture dividing said mounting aperture into a smaller diameter lower portion and a larger diameter upper portion and wherein said trimmer head further comprises a plurality of fastening members, said fastening members each defining a head portion, a smooth upper shaft portion and a threaded lower shaft portion and including a plurality of securement nuts, said nuts being disposed within said housing in a fixed disposition in axial alignment with said mounting apertures in said line holders and wherein said fastening members extend through said mounting apertures in said line holders such that said head portions thereof are disposed in said larger diameter portions of said mounting apertures and bear against said shoulders therein, said smooth upper shaft portions of said fastening members are disposed in said smaller diameter portions of said mounting apertures adjacent to said shoulders therein and said threaded lower shaft portions of said fastening members extend through said housing and threadably engage said securement nuts therein, thereby rotatably and removably securing said line holders to said housing.

6. The trimmer head of claim 5 including a plurality of elongated substantially rigid cutting blades, said blades having mounting apertures extending therethrough said mounting aperture in said cutting blades have substantially the same configuration as said mounting apertures in said line holders whereby said line holders and said cutting blades can be interchangeably rotatably secured to said housing.

7. The trimmer head of claim 1 comprising a plurality of mounting assemblies for releasably and rotatably mounting said line holders on said housing, each of said mounting assemblies comprising a relatively flat, slightly elevated support surfaces on said upper annular surface of said housing below and adjacent to said line holders, a central aperture extending through each of said support surfaces, and a plurality of securement nuts rigidly secured within said housing above and in axial alignment with said apertures in said support surfaces and wherein said line holders each define a mounting aperture extending therethrough proximate an opposed end thereof from said extended end and an annular shoulder disposed in said mounting aperture of each line holder dividing said mounting aperture into a smaller diameter lower portion and a larger diameter upper portion and additionally including a plurality of elongated substantially rigid cutting blades, each of said blades having mounting apertures extending therethrough, said mounting apertures in said cutting blades having substantially the same configuration as said mounting apertures in said line holders whereby said line holders and said cutting blades can be interchangeably rotatably secured to said housing.

* * * * *